(12) United States Patent
Stephany

(10) Patent No.: US 6,587,639 B2
(45) Date of Patent: Jul. 1, 2003

(54) METHOD AND SYSTEM FOR GENERATING SALES OF COMPACT DISCS FROM A PREDETERMINED ORIGIN

(75) Inventor: Thomas M. Stephany, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/821,528

(22) Filed: Mar. 29, 2001

(65) Prior Publication Data

US 2002/0172506 A1 Nov. 21, 2002

(51) Int. Cl.[7] .................................. H04N 5/91
(52) U.S. Cl. .................... 386/95; 386/125; 386/126
(58) Field of Search .............................. 705/1; 386/125, 386/95, 126; 360/60; H04N 5/91

(56) References Cited

U.S. PATENT DOCUMENTS

| | | | | |
|---|---|---|---|---|
| 4,837,628 A | * | 6/1989 | Sasaki | 369/55.32 |
| 5,371,792 A | * | 12/1994 | Asai et al. | 705/59 |
| 5,448,371 A | * | 9/1995 | Choi | 386/94 |
| 5,454,096 A | * | 9/1995 | Otsuka et al. | 386/117 |
| 6,249,499 B1 | * | 6/2001 | Andoh | 348/220.1 |

* cited by examiner

Primary Examiner—Vincent Boccio
Assistant Examiner—James A. Fletcher
(74) Attorney, Agent, or Firm—Peyton C. Watkins

(57) ABSTRACT

A method for generating sales of compact discs from a predetermined origin, the method comprises the steps of programming a compact disc writer to write only to compact discs containing a predetermined code; encoding a compact disc with a predetermined digital code; searching for a digital code on a compact disc via the programmed compact disc writer; and if the code is located, transferring data from memory captured by another device to the encoded compact disc.

4 Claims, 2 Drawing Sheets

METHOD AND SYSTEM FOR GENERATING SALES OF COMPACT DISCS FROM A PREDETERMINED ORIGIN

FIELD OF THE INVENTION

The present invention relates to sales of compact discs and, more particularly, to a method for generating additional sales of compact discs.

BACKGROUND OF THE INVENTION

Generating sales of consumable digital components is in response to the growing number of people using digital still cameras, and is also an effort to add value to the users of those cameras. Digital still cameras are readily becoming an alternative for film-based cameras. In fact, the most significant change is that the film is replaced by an electronic sensor array for capturing the image and a memory component for storing the image. These images are traditionally stored within the memory component, which can typically be removed for viewing, storage, printing, processing and the like.

Although the presently known and utilized method for storing and printing images from digital cameras is satisfactory, there are drawbacks. One drawback of the prior art method is the cost of the memory device, which is typically $50 or more depending on memory density. The memory device is too costly to lose and is inconvenient to leave at a store for processing, since doing so disables the camera. It is also time consuming for the consumer to download stored images from the memory device so that the memory device can be erased and reused within the digital still camera. The process requires having a computer for accessing the memory device, and transferring the pictures to the computer or some other storage medium so they can be processed later. Alternatively, a memory card has to be simply erased to use further, and consequently, the consumer loses all the pictures thereon.

Consequently, a need exists for a method which enables the easy storage of digital images, and which permits efficient printing of the images.

SUMMARY OF THE INVENTION

The present invention is directed to overcoming one or more of the problems set forth above. Briefly summarized, according to one aspect of the present invention, the invention resides in a method for generating sales of compact discs from a predetermined origin, the method comprising the steps of (a) programming a compact disc writer to write only to compact discs containing a predetermined code; (b) encoding a compact disc with a predetermined digital code; (c) searching for a digital code on a compact disc via the programmed compact disc writer; and (d) if the code is located, transferring data from memory captured by another device to the encoded compact disc.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantages of writing only to compact disc from a specific origin so that the quality aspects of transferring and storing images are maintained.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
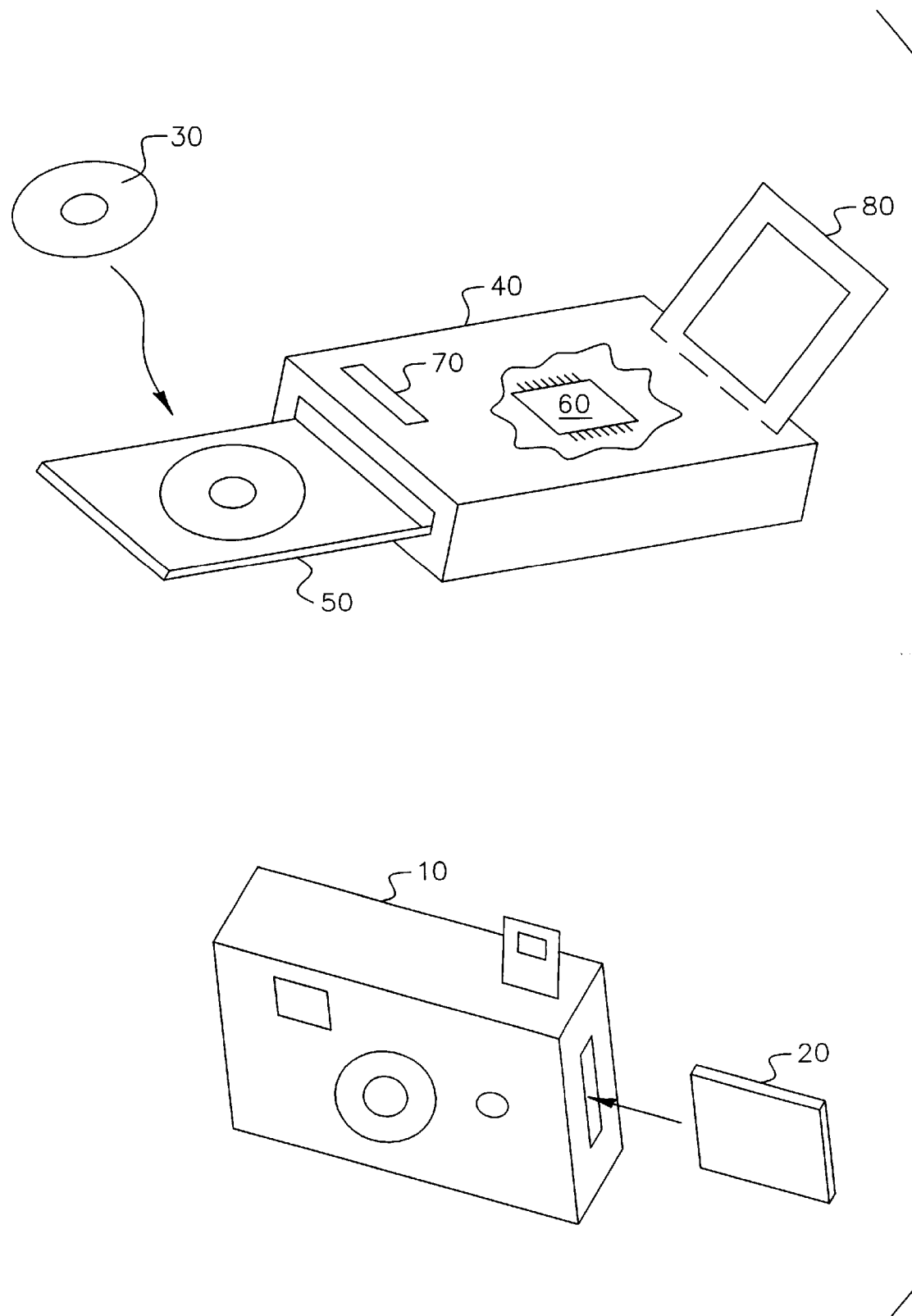
FIG. 1 is a perspective drawing of the present invention illustrating a compact disc, compact disc writer, and a digital camera.

Referring to FIG. 1, there is illustrated a digital still camera 10 of the present invention. The camera includes a sensor (not shown) for receiving incident light that is converted into a digital image, as is well known in the art. The image is then transferred from the sensor to a memory card 20 on which the captured image is stored.

There is also shown a compact disc 30 that does not contain any data except for a predetermined digital code on a predetermined sector of the disc that indicates the origin of the disc. As will be described hereinbelow, the disc 30 will eventually have data, for example images, written to it by a compact disc writer 40.

The compact disc writer 40 includes a retractable receiving platform 50 for receiving the compact disc 30. The platform 50 is retracted into the interior of the writer 40 for operation of the writing process. The writer 40 also includes laser and other writing components (not shown) for writing data, images, text, graphics, sound and the like to the compact disc 30, and reading components (not shown) for reading data from the compact disc 30, both well known in the art. A microprocessor 60 is disposed in the interior of the writer 40, and is programmed to write data to the disc 30 upon meeting specific conditions, described hereinbelow. A receiving slot 70 is positioned on a top portion of the writer 40 for receiving the memory card 20. The memory card 20 will have its data written to the compact disc 30 so that the card 20 can be conveniently re-used, as will also be described hereinbelow. A touch-sensitive display 80 also rests on the top portion of the writer 40 for displaying messages to the user, and for receiving input from the user.

Figure 2:
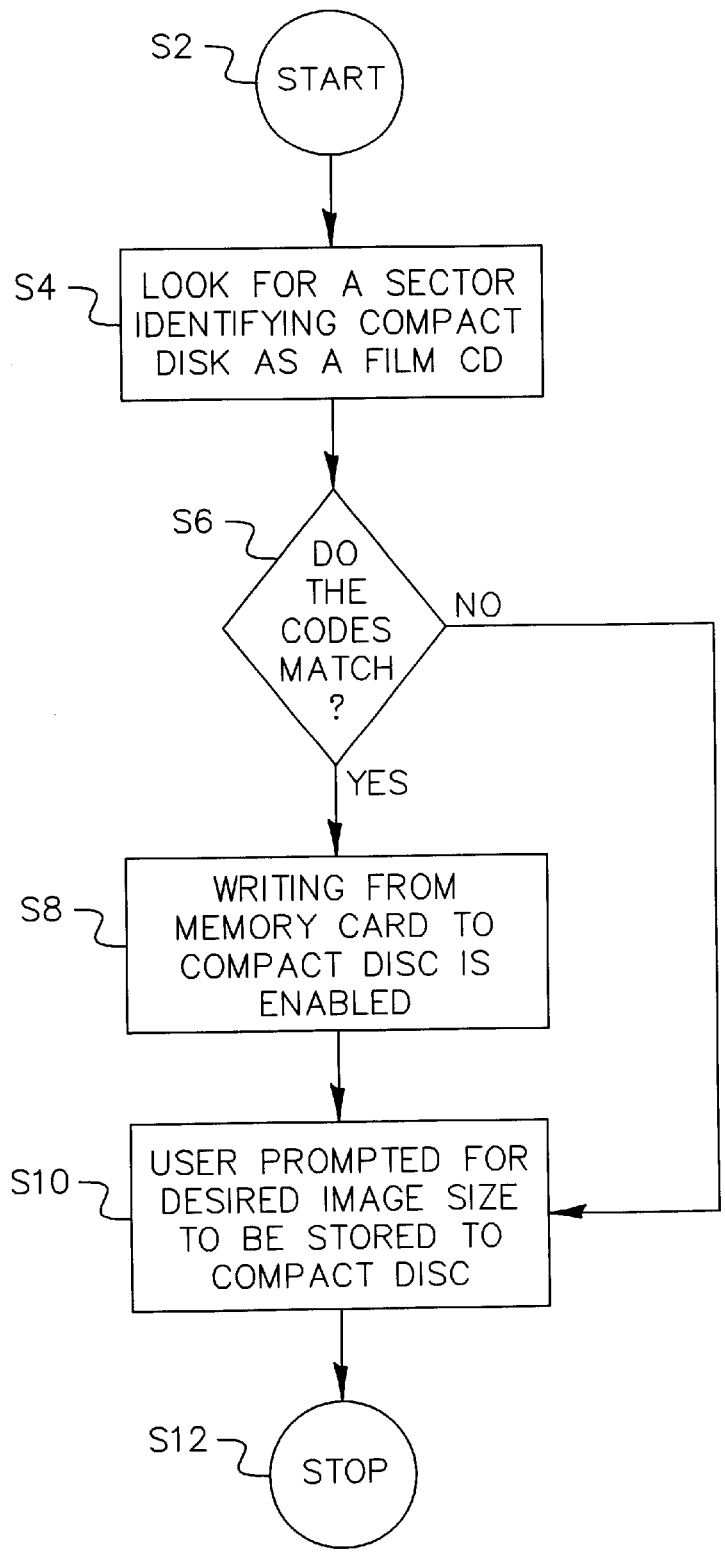
FIG. 2 is a flowchart of a software program of the present invention preferably programmed into the compact disc writer.

Referring briefly to FIG. 2, there is shown a flowchart of the software program embedded in the microprocessor for directing operations of the writer. The program is initiated S2 upon insertion of the platform, and the reader components are then directed to read a predetermined sector S4, for example the first sector of the disc, for identifying the disc originating from a predetermined origin. If the digital code read from the compact disc 30 matches S6 the code programmed into the microprocessor 60, writing from the memory card 20 to the compact disc 30 is enabled S8. If the codes do not match S6, writing is prohibited and the disc is ejected S12 from the writer with an error message displayed on the display. If the codes match, the user is prompted S10 by a message on the display as to the desired size for storing the images to the disc, for example 3×5, 4×6, or 5×7 (all dimensions in inches). The user presses the screen to indicate their preference and the images are stored accordingly. After completion of the writing process, the disc is ejected and the software program is terminated S12.

Alternatively to programming the software into the microprocessor, the compact disc could contain the software program. In this case, the writer is programmed to read the software program from the disc before beginning its matching of the codes and writing process.

The invention has been described with reference to a preferred embodiment. However, it will be appreciated that variations and modifications can be effected by a person of ordinary skill in the art without departing from the scope of the invention.

| PARTS LIST | |
|---|---|
| 10 | digital still camera |
| 20 | memory card |
| 30 | compact disc |
| 40 | compact disc writer |
| 50 | retractable receiving platform |
| 60 | microprocessor |
| 70 | receiving slot |
| 80 | touch-sensitive display |

What is claimed is:

1. A method for generating sales of compact discs from a predetermined origin, the method comprising the steps of:

(a) programming a compact disc writer to write only to compact discs containing an enabling code which enables the compact disc writer to write to only compact discs having a predetermined digital code;

(b) encoding a compact disc with the predetermined digital code;

(c) searching for the predetermined digital code on a compact disc via the programmed compact disc writer; and (d) if the predetermined digital code is located, transferring images from memory which images have been captured by another device to the encoded compact disc by the writer which is enabled to write by detecting the digital code.

2. The method as in claim 1, wherein step (d) includes transferring images captured by a digital camera.

3. A system for generating sales of compact discs from a predetermined origin, the system comprising:

(a) a compact disc writer programmed to write only to compact discs containing a code which enables the compact disc writer to write to only compact discs having a predetermined digital code and programmed to search for a digital code on a compact disc;

(b) a compact disc encoded with the digital code; and (c) if the digital code is located, a writer which writes images from memory captured by another device to the encoded compact disc by the writer which is enabled to write by detecting the digital code.

4. The system as in claim 3 further comprising a digital camera for capturing images which are stored on the memory.

* * * * *